US009189297B2

(12) United States Patent
Chakrabarti et al.

(10) Patent No.: US 9,189,297 B2
(45) Date of Patent: Nov. 17, 2015

(54) MANAGING SHARED MEMORY

(75) Inventors: Dhruva Ranjan Chakrabarti, San Jose, CA (US); Sandya Srivilliputtur Mannarswamy, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1028 days.

(21) Appl. No.: 12/967,899

(22) Filed: Dec. 14, 2010

(65) Prior Publication Data

US 2012/0151155 A1 Jun. 14, 2012

(51) Int. Cl.
*G06F 12/00* (2006.01)
*G06F 9/52* (2006.01)
*G06F 12/14* (2006.01)
*G06F 12/08* (2006.01)

(52) U.S. Cl.
CPC .............. *G06F 9/526* (2013.01); *G06F 12/084* (2013.01); *G06F 12/1416* (2013.01)

(58) Field of Classification Search
CPC .... G06F 12/1416; G06F 12/084; G06F 9/256
USPC ........................................................ 711/152
See application file for complete search history.

(56) References Cited

U.S. PATENT DOCUMENTS

| 7,430,627 | B2 * | 9/2008 | McKenney | .................... 710/200 |
| 7,809,916 | B1 * | 10/2010 | Shavit et al. | ................... 711/170 |
| 2007/0169030 | A1 | 7/2007 | Tarditi et al. | |
| 2008/0098181 | A1 * | 4/2008 | Moir et al. | ..................... 711/152 |
| 2008/0178156 | A1 * | 7/2008 | Kahlon et al. | ................ 717/126 |
| 2009/0006406 | A1 | 1/2009 | Taillefer | |
| 2009/0172306 | A1 | 7/2009 | Nussbaum et al. | |
| 2009/0172327 | A1 | 7/2009 | Shavit et al. | |
| 2009/0217253 | A1 | 8/2009 | Song et al. | |
| 2010/0251239 | A1 * | 9/2010 | Casas et al. | .................... 718/100 |
| 2010/0333095 | A1 * | 12/2010 | Shavit et al. | .................. 718/102 |

OTHER PUBLICATIONS

Prasad; "Dynamic Storage Allocation", retrieved from http://www.cs.virginia.edu/~son/cs414.f05/lec11.slides.pdf, Published Fall 2005.*
Zhang et al. "Minimum Lock Assignment: A Method for Exploiting Concurrency among Critical Sections", Published 2008.*
Wu, Peng et al., "Compiler and Runtime Techniques for Software Transactional Memory Optimization", IBM Research University of Rochester, 18 pages, Published: 2008.
Chaitin, "Register Allocation and Spilling via Graph Coloring", SIGPLAN Notices 39, Apr. 4, 2004, pp. 66-74.
Yoo et al., "Kicking the Tires of Software Transactional Memory: Why the Going Gets Tough", Proceedings of the Symposium on Parallelism in Algorithms and Architectures (SPAA), Jun. 14-16, 2008, pp. 265-274.
Emmi et al., "Lock Allocation", Proceedings of the Symposium on Principles of Programming Languages (POPL), 2007, pp. 291-296.
Chakrabarti et al., "Compiler Aided Selective Lock Assignment for Improving the Performance of Software Transactional Memory", Conference on Principles and Practice of Parallel Programming 2010, Published: Jul. 20, 2009, 10 pages.
Chakrabarti et al., "Compiler Aided Selective Lock Assignment for Improving the Performance of Software Transactional Memory", Conference on Principles and Practice of Parallel Programming 2010, Corrected Published Date: Jan. 2010, 10 pages.

* cited by examiner

*Primary Examiner* — Prasith Thammavong
(74) *Attorney, Agent, or Firm* — Brooks, Cameron & Huebsch, PLLC

(57) ABSTRACT

Systems, methods, and computer-readable and executable instructions are provided for managing shared memory. A method for managing shared memory can include statically assigning a first number of locks to the shared memory during compile-time and dynamically assigning a second number of locks to the shared memory during runtime.

15 Claims, 5 Drawing Sheets

MANAGING SHARED MEMORY

BACKGROUND

A lock is a mechanism for enforcing limits on access to a resource in a multithreaded shared memory programming environment. In a software transactional memory (STM) implementation, a runtime address is assigned a corresponding lock without any analysis of an application's characteristics, which may result in high runtime overheads. For example, in a word-based STM implementation, the mapping from a runtime address to a lock is computed using a tagless hashing technique. A defined procedure or mathematical function (e.g. hash function) may be used to find and assign locks to certain shared memory locations. Because no tags of colliding memory locations are maintained, distinct memory locations may be assigned to the same lock causing conflicts, even though there may be no actual conflicts (by virtue of the memory addresses being distinct). These conflicts may be referred to as false conflicts and can impact execution time by increasing the number of aborts or rollbacks.

When a program using atomic sections is presented to a compiler, it can perform one of two actions. The program may lower atomic sections into calls to an STM library, or it may generate a mapping from shared memory to locks and use a locking discipline while accessing shared memory locations. The latter may be referred to as compile-time lock assignment. Compile-lock assignment may be used to address false conflicts, in addition to changing the STM hash function and increasing the number of locks available to a program.

DETAILED DESCRIPTION

Figure 1:
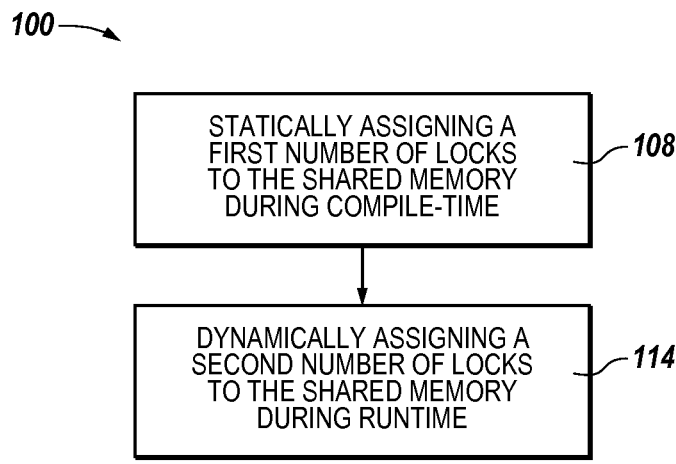
FIG. 1 is a flow chart illustrating an example of a method of managing shared memory according to the present disclosure.

Examples of the present disclosure may include methods, systems, and computer-readable and executable instructions and/or logic. An example of a method for managing a shared memory can include statically assigning a first number of locks to the shared memory during compile-time and dynamically assigning a second number of locks to the shared memory during runtime. Another example of a method for managing a shared memory may use a hybrid technique (e.g., combination of static and runtime techniques) to automatically generate mapping from the shared memory to locks in order to reduce false conflicts.

Shared memory multithreaded programs can use locks to synchronize accesses to shared memory locations made by different threads. Using locks may be error-prone since a program needs to consistently follow a locking discipline. A violation of this discipline can lead to concurrency bugs such as data races, deadlocks, and atomicity violations. Use of atomic sections can raise the programming abstraction by avoiding working with locks. The programmer can mark sections of code that appear to execute atomically. The responsibility of generating a correctly and efficiently synchronized program may be shifted from the programmer to the underlying implementation.

Atomic sections may be supported by executable instructions either through the use of optimistic concurrency by using STM or through the use of pessimistic concurrency using compiler-assigned locks. In an STM-based implementation, the compiler is responsible for translating an atomic section into calls to an STM library. The STM library can use locks to synchronize shared accesses, but the locks are not exposed to the programmer. An STM can maintain a table of locks, and a shared address can be hashed to map to an entry in the lock table. Since there are fewer locks than memory addresses, multiple addresses may map to the same lock. When an STM-based program executes, if multiple atomic sections appear to reference the same shared memory location, and one of these references is a write, a conflict is said to have occurred. In such a case, some of the threads may abort their atomic sections and restart. If a conflict is detected because of references to distinct memory addresses by two threads in their atomic sections, but because these memory addresses are mapped to the same lock, the conflict is referred to as a false one. This is because the memory addresses themselves are distinct, and an alternative mapping can result in the addresses being assigned to different locks. Avoiding false conflicts is important because of its impact on rollbacks and consequential runtime performance.

Prior solutions for reducing false conflict issues may not be adequate. Changing the hash function is a trial-and-error method using multiple hash functions to understand which function provides the best performance for a given application and input data. This method does not eliminate false conflicts, and shared location references that impact performance may still falsely conflict.

Increasing the size of a lock table or increasing the number of locks available may allow for a lower number of false conflicts encountered; however, the extent to which a lock table can be enlarged is limited. Maintaining a purely static compiler-driven lock assignment may result in numerous false conflicts, as well. A purely static compiler-driven lock assignment involves the compiler statically assigning locks to shared locations. A compiler may include a computer program (or set of programs) that transforms source code written in a programming language into another computer language. This static compiler-driven method results in potentially inaccurate points-to analysis and often ends up assigning the same lock to distinct shared locations resulting in many false conflicts.

Using a combination of static and runtime techniques (e.g., hybrid technique) to generate mapping from a specific shared location to a specific lock can reduce false conflicts by selectively choosing a set of locations for which false conflict may happen and performing lock assignments on them alone during compile-time. A hybrid lock assignment technique may be used to achieve improved performance over either purely static or purely dynamic lock assignment techniques.

One problem addressed by the present disclosure is reducing false conflicts for selected shared memory locations. In an example of the present disclosure, compiler-driven lock assignment for a subset of shared memory locations is combined with hash-function-based runtime lock assignment for the remaining shared memory locations. A hybrid technique improves lock assignment over purely static or purely dynamic lock assignment techniques. A hybrid technique may allow for the generation of application-aware, selective, static, compile-time lock assignment that reduces the chances of false conflicts during runtime. The reduction of false conflict can lead to a decrease in transaction aborts and an improved runtime performance.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure. As used herein, the designators "N" and "M," particularly with respect to reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 208 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 is a flow chart illustrating an example of a method of managing shared memory according to the present disclosure. The method 100 includes statically assigning a first number of locks during compile-time at 108. The method can include searching the shared memory for potential false conflict shared memory locations and selecting a number of the potential false conflict shared memory locations for static lock assignment. An interference graph method can be used to capture relationships between the shared memory locations for static lock assignment. The statically assigned first number of locks are assigned to those shared memory locations for which a compiler can assign locks without false conflict, or rather, are in a must-alias relationship.

The method 100 further includes dynamically assigning a second number of locks during runtime at 114. The dynamic assignment may occur through the use of a hash function, mapping a given shared memory address to an entry in a lock table.

In one example, the method includes selectively performing compile-time assignment of locks for some of the shared memory locations where such an approach would be beneficial, and using runtime lock assignment to handle the other shared memory locations appropriately. Shared memory locations for lock assignment are selected by a compiler. The compiler performs an inter-procedural analysis of the application and creates a list of shared memory locations made in each atomic section. During inter-procedural analysis, the compiler performs points-to analysis (e.g., alias analysis) on the program and maps each pointer in the program to a points-to set. The points-to set can include a set of memory locations to which a pointer points. Two pointers can be aliased if they point to the same location. Points-to analysis can allow the compiler to determine which memory locations in the program will be affected by a statement, (e.g. a small standalone element of an imperative programming language). Two types of alias relationships include a must-alias relationship and a may-alias relationship. A must-alias relationship is an alias relationship that holds true for all executions of the program, and a may-alias relationship is one that holds true for some executions of the program. For compile-time lock assignment, memory locations whose points-to set include solely must aliases are selected. This is done because these are the set of memory locations for which the compiler has definitive alias information that is accurate for all execution paths, causing the compile-time lock assignment to be effective.

In an example of the present disclosure, in order to ensure that a shared memory location is protected by a lock consistently throughout the entire execution of the application, a selection process is used. The selected shared memory locations have solely must-alias entries in their points-to set. For each of the shared memory locations having solely must-alias entries in its points-to set, shared memory locations corresponding to each of these must-alias entries can be selected for compile-time lock assignment and will be statically assigned a compile-time lock. These locations may be referred to as selective compile-time lock assignment (SCLA) memory locations. For these shared memory locations, the runtime STM library uses the compiler-assigned lock mapping.

In an example, a tagged hash table, called a Compiler Lock Assignment Table (CLAT), may be maintained that contains a mapping from a shared memory address to its compiler-assigned lock. As used herein, tagging the CLAT is intended to mean that the CLAT can incorporate collision resolution. In an example of the present disclosure, a tagless hash table of locks can be maintained for non-SCLA shared memory locations. This table may be referred to as a Runtime Lock Table (RLT). In an example, given a non-SCLA shared memory address, a hash function is used to map the address to an entry in the RLT.

If a shared access has a may-alias to an SCLA memory location in its points-to set, the compiler instruments the memory references, so that when the lock is required for the shared memory location, the runtime STM library first checks, by querying the CLAT with the shared memory address, if a compile-time lock assignment is available for the shared memory location. A compiler-assigned lock mapping will be available if the shared access points to a SCLA memory location at runtime. In that case, runtime uses the lock assigned at compile-time. Otherwise, a runtime lock assignment can be used. If the shared access points to a non-SCLA memory location at runtime, a lock will be retrieved from the RLT by mapping the address of the accessed shared location to an entry in the RLT.

In an example, locks are statically assigned by the compiler to the selected memory locations in compile-time. An example of the present disclosure can construct a set of locks and a mapping locking discipline that maps each shared memory location to a lock, so that no two atomic sections need a common lock unless they access common shared memory locations. An interference graph method may be used to capture the relationship between the shared memory locations. In an example interference graph method, each shared memory location is assigned a separate node. Edges are added between two nodes if assigning them the same lock may inhibit concurrency. Specifically, an edge is added if there exists an atomic section that accesses a first node, but not a second node, and there exists an atomic section that accesses the second node, but not the first node.

In an example, an interference graph is used to compute the static lock assignment. If two nodes (or two distinct memory locations) in the interference graph have an edge between them, it means that they should be assigned distinct locks to achieve maximum concurrency. If no edge is present between two nodes, it means that there is no loss of concurrency by assigning the same lock to both of them.

This disclosure provides a technique to generate a mapping from a shared memory address to its protecting lock using a hybrid scheme, assigning some locks at compile-time and others at runtime. However, in an example of the present disclosure, all of the locks are used by an STM without changing its base concurrency method (e.g., optimistic or pessimistic concurrency). In other words, there is no change as to when locks are acquired and released. The following, in the interface between the compiler and the STM, achieve the handshake: (1) New STM interfaces, SetCompilerLockMapping and GetCompilerLockMapping, are provided. These calls are inserted by the compiler. SetCompilerLockMapping is called with a shared memory address and the corresponding statically assigned lock and invoking it results in adding the mapping into the CLAT. GetCompilerLockMapping, when invoked with a shared memory address, returns the corresponding statically assigned lock, if any, from the CLAT. (2) New STM interfaces, TxLoadWithCompilerLock and TxStoreWithCompilerLock, are provided. These may be inserted by the compiler (instead of the original TxLoad and TxStore respectively) if the concerned shared memory address can be an SCLA memory location at runtime. When a lock for the shared memory address is desired, these new interfaces query CLAT first to check for a mapping. If found, the corresponding lock is used, otherwise the STM's default lock retrieval technique is used (which includes querying the tagless hash table RLT with the shared memory address).

The locks determined statically (i.e. during compile time) may be allocated at program startup or during program execution. For statically allocated data, the corresponding locks are allocated at program startup and the CLAT is populated with these mappings at the start of the program. For dynamically allocated data, the corresponding locks may be allocated, and the corresponding CLAT mappings may be created immediately after dynamic allocation of the data.

In a purely compile-time lock assignment scheme, instrumentation at compile-time may need to be added to acquire the required lock before accessing the shared memory location. However, according to examples of the hybrid technique of the present disclosure, the lock mapping is generated at compile-time and code is added to communicate this mapping to runtime. In a purely compile-time lock assignment, lock mapping may be needed for all shared memory data. However, according to examples of the hybrid technique of the present disclosure, the lock mapping is done selectively at compile-time so as to avoid false conflicts that traditional compile-time lock assignment is susceptible to.

Figure 2:
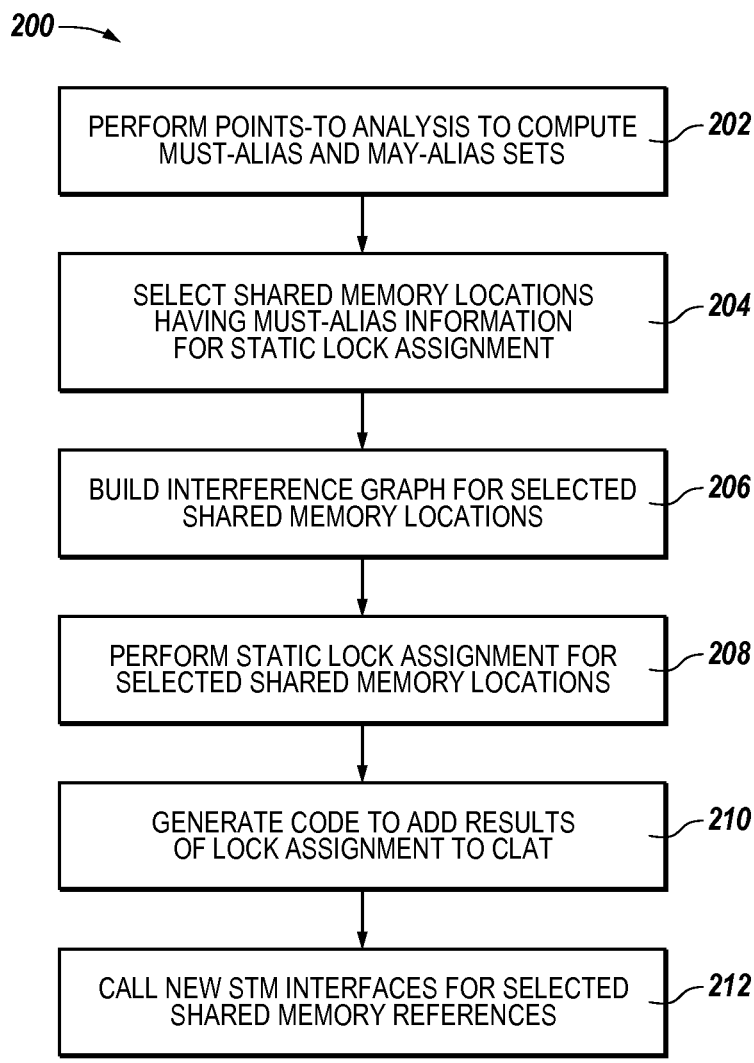
FIG. 2 is a flow chart illustrating an example of a method of managing shared memory according to the present disclosure.

FIG. 2 is a flow chart illustrating an example method 200 of managing shared memory according to the present disclosure. This method includes the compiler performing points-to analysis to compute must-alias and may-alias sets at 202. At 204, shared memory locations having must-alias information may be selected by the compiler for static lock assignment. An interference graph may be built by the compiler for the selected shared memory locations at 206, and static lock assignment for the selected shared memory locations may be performed at 208 by the compiler. The compiler may generate code at 210 to add results of the lock assignment to a CLAT, and new STM interfaces for the selected shared memory locations or references may be called at 212 by the compiler.

Figure 3:
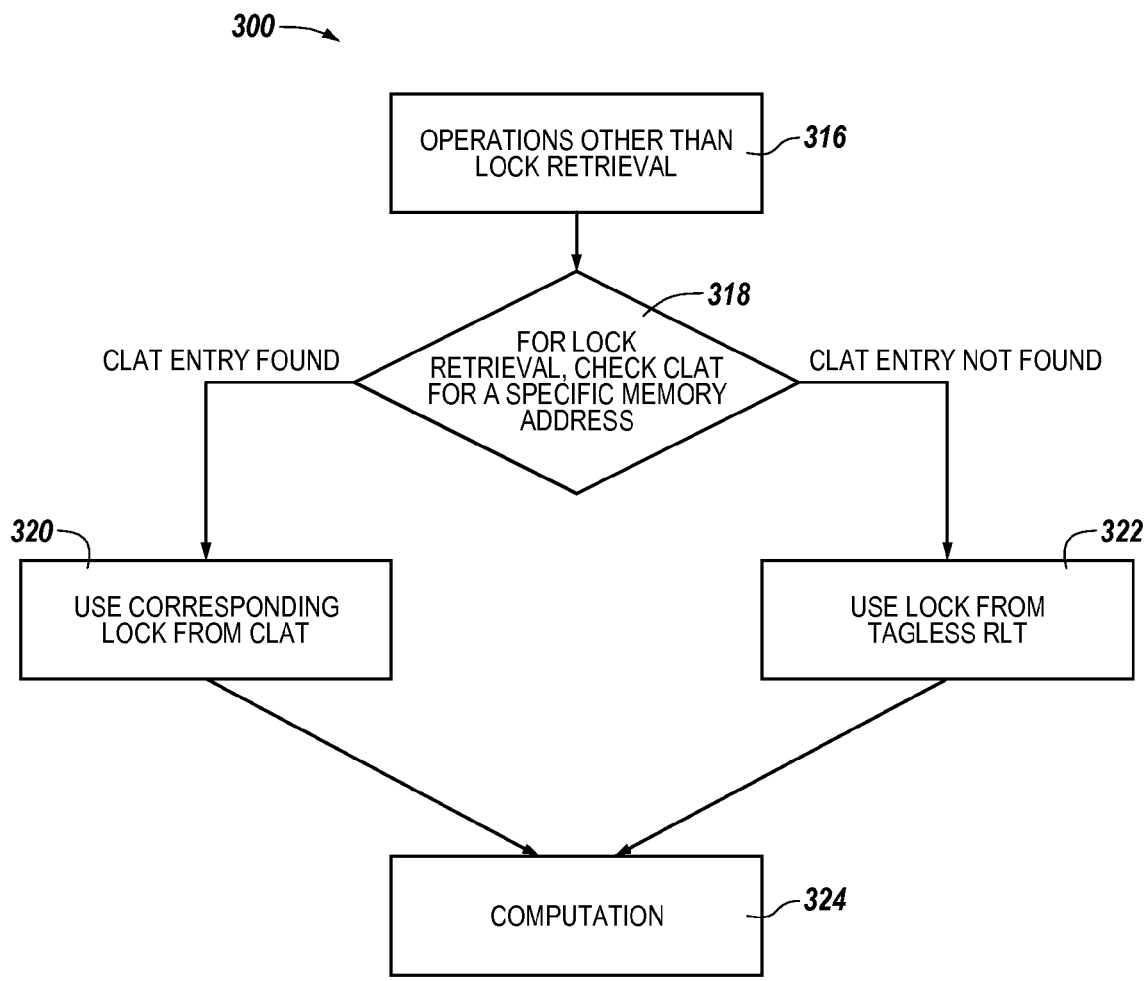
FIG. 3 is a flow chart illustrating an example of a method of managing shared memory according to the present disclosure.

FIG. 3 is a flow chart illustrating an example method 300 of managing shared memory according to the present disclosure. In an example, locks are retrieved at runtime according to the present disclosure. At 316, operations including lock assignment proceed until the lock retrieval may begin. At 318, a CLAT is checked for a specific memory address. If the specific memory address is found in the CLAT, a corresponding lock from the CLAT is used at 320. If the specific memory address is not found in the CLAT, a lock from a tagless hash table (e.g., RLT) may be used at 322. Once the lock is retrieved, computation can continue at 324.

Figure 4:
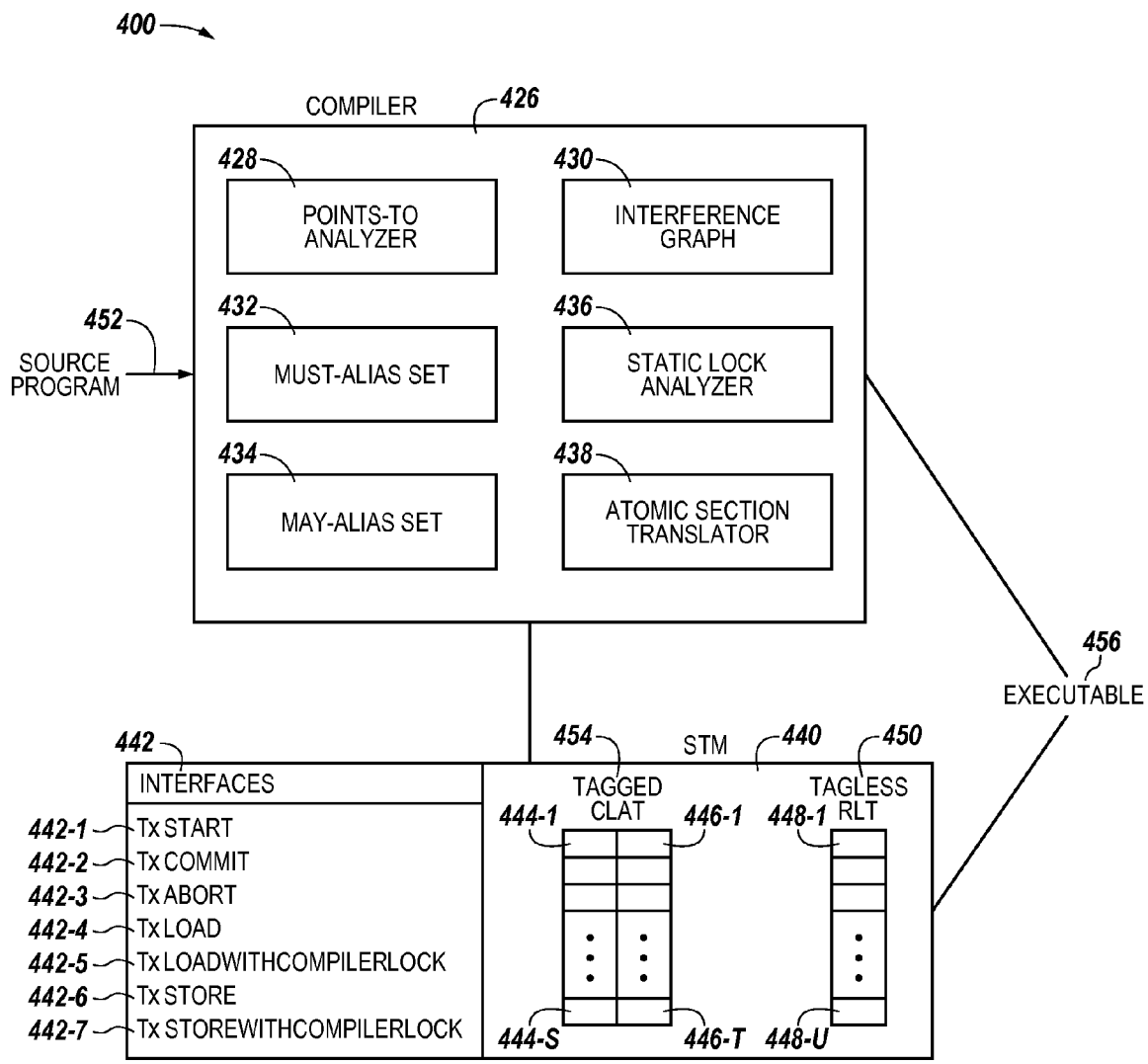
FIG. 4 is a block diagram illustrating an example of component interaction for managing shared memory according to the present disclosure.

FIG. 4 is a block diagram illustrating an example of component interaction for managing shared memory according to the present disclosure. A compiler 426 may translate atomic sections received from a source program 452 into calls to an STM 440. The compiler 426 may include a points-to analyzer 428, an interference graph 430, a must-alias set 432, a may-alias set 434, a static lock analyzer 436, and an atomic section translator 438. In an example, the STM 440 may include interfaces 442. The interfaces may include transaction start 442-1, transaction commit 442-2, transaction abort 442-3, transaction load 442-4, transaction load with compiler lock 442-5, transaction store 442-6, and transaction store with compiler lock 442-7. The STM may include a listing or table of memory locations and lock assignments. In an example, memory locations 444-1 . . . 444-S are assigned using a tagged CLAT 454 to locks 446-1 . . . 446-T. In an example, the STM may include a listing of locks 448-1 . . . 448-U that may be assigned using a tagless hashing technique (e.g., RLT) 450. In an example, the STM maintains a table of locks, and shared addresses can be hashed to map to an entry in the lock table. After locks are assigned at runtime or compile-time, the locks may be used in execution of an application at 456.

In an example, the following code snippet (annotated with line numbers) and written using a programming language similar to C language without loss of generality may be considered:

1: Integer g1=g2=g3=0;
2: Pointer p=q=r=null;
3: atomic {
4: p=&g1;
5: if (condition1)
6: q=&g1;
7: else q=&g2;
8: if (condition2)
9: r=&g2;
10: else r=&g3;
11: *p=10;
12: *q=20;
13: *r=30;
14:}

The method includes three local pointers p, q, and r and three shared memory locations g1, g2, and g3. Since p is assigned to point to g1 unconditionally on line 4, p's points-to set has {must_alias (g1)}. Since, depending on condition1, q can either point to g1 or g2, q's points-to-set has {may_alias (g1), may_alias(g2)}. Similarly, r's points-to set has {may_alias(g2), may_alias(g3)}. In this example, g1 is selected for SCLA (since this is the only location with a must-alias), i.e. the lock for the reference corresponding to *p on line 11 will be resolved from CLAT. On line 12, *q is instrumented by the compiler so that at runtime STM first checks to see if a compiler-assigned lock is available for the corresponding memory location. In an example, if q points to g1 at runtime, a compiler-assigned lock mapping may be found and used. In an example, if q points to g2 at runtime, it may not have a compiler lock mapping, and STM may perform lock assignment. For the shared access r, STM may perform lock assignment, i.e. the lock for the reference corresponding to *r on line 13 will be resolved from RLAT.

Figure 5:
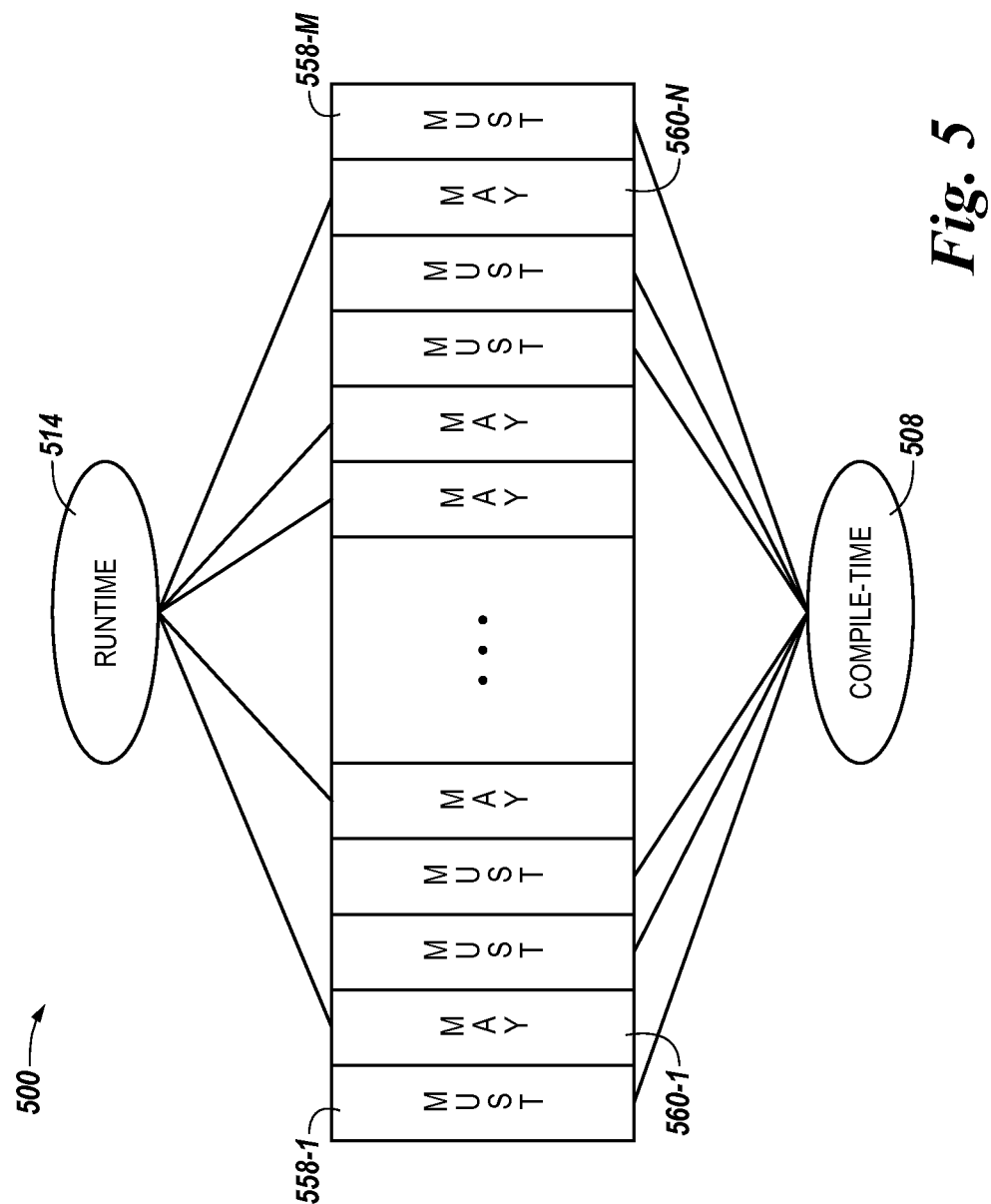
FIG. 5 illustrates a diagram of an example of a system for managing shared memory according to the present disclosure.

FIG. 5 illustrates a diagram of an example system 500 for managing shared memory according to the present disclosure. Points-to analysis, (e.g. alias analysis) can be used to determine a memory storage location that a pointer can point to. A compiler can determine what memory locations can be affected by a statement. Two alias relationships are possible. Shown in FIG. 5 are a number of points-to sets 558-1 . . . 558-M that include solely must-aliases and a number of points-to sets 560-1 . . . 560-N that include solely may-aliases. A must-alias relationship results in a statically assigned first number of locks being assigned solely to those locations for which a compiler can accurately assign locks without false conflict. A may-alias relationship results in a dynamically assigned second number of locks being assigned to those locations for which a compiler cannot accurately assign locks without false conflict. Shared memory locations whose points-to set includes solely must-aliases are selected for compile-time lock assignment 508. Shared memory locations whose points-to set includes solely may-aliases are selected for runtime lock assignment 514. In an example, some must-aliases may be left to runtime for performance reasons.

Figure 6:
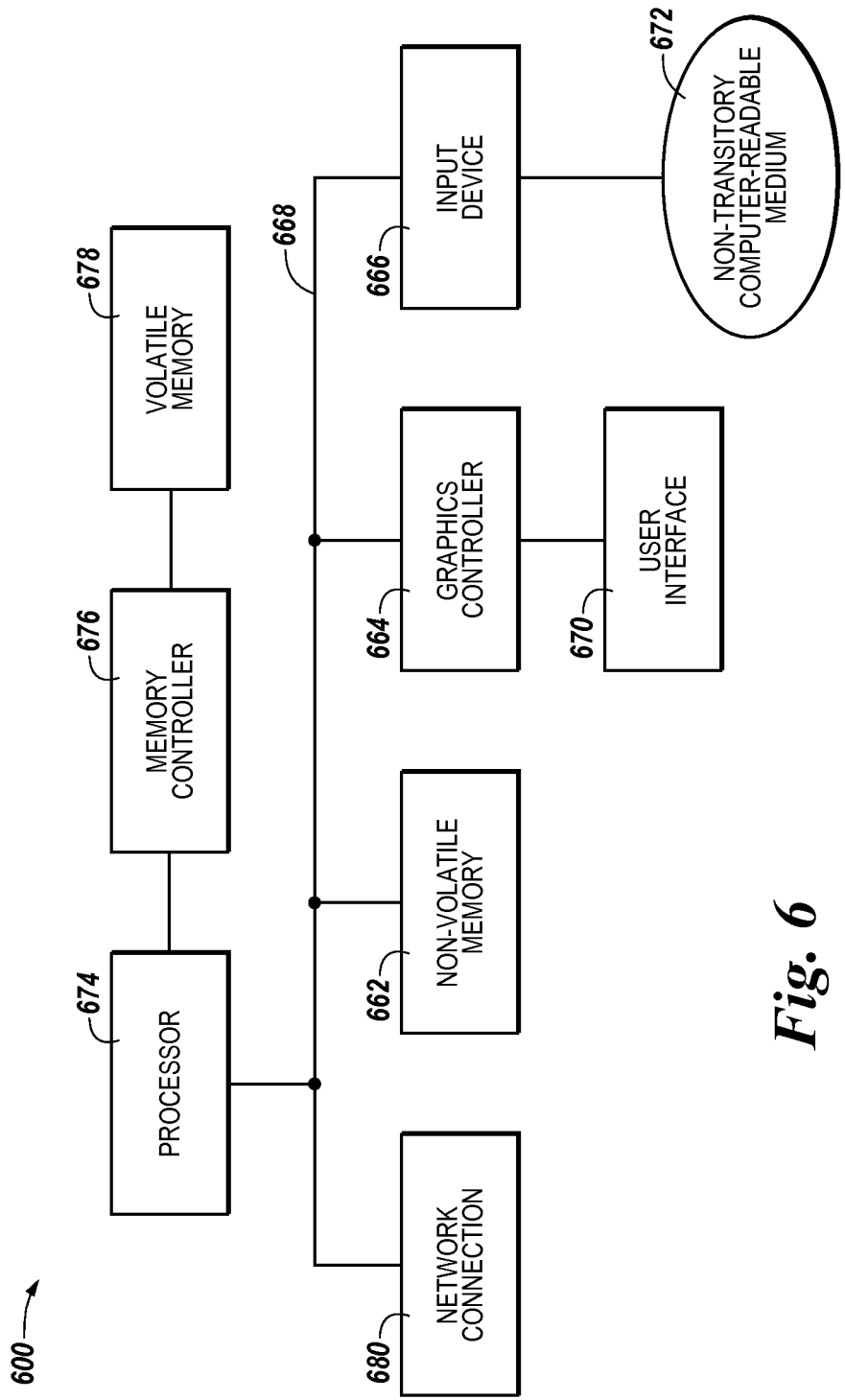
FIG. 6 illustrates a block diagram of an example of a computing system for managing shared memory according to the present disclosure.

FIG. 6 illustrates a block diagram of an example of a computing system 600 for managing shared memory according to the present disclosure. However, examples of the present disclosure are not limited to a particular computing system configuration. The system 600 can include processor resources 674 and memory resources (e.g., volatile memory 678 and/or non-volatile memory 662) for executing instructions stored in a tangible non-transitory medium (e.g., volatile memory 678, non-volatile memory 662, and/or computer readable medium 672) and/or an application specific integrated circuit (ASIC) including logic configured to perform various examples of the present disclosure. A machine (e.g., a computing device) can include and/or receive a tangible non-transitory computer-readable medium 672 storing a set of computer-readable instructions (e.g., software) via an input device 666. As used herein, processor resources 674 can include one or a plurality of processors such as in a parallel processing system. Memory resources can include memory addressable by the processor resources 674 for execution of computer readable instructions. The computer readable medium 672 can include volatile and/or non-volatile memory such as random access memory (RAM), magnetic memory such as a hard disk, floppy disk, and/or tape memory, a solid state drive (SSD), flash memory, phase change memory, etc. In some examples, the non-volatile memory 662 can be a database including a plurality of physical non-volatile memory devices. In various examples, the database can be local to a particular system or remote (e.g., including a plurality of non-volatile memory devices 662).

The processor resources 674 can control the overall operation of the system 600. The processor resources 674 can be connected to a memory controller 676, which can read and/or write data from and/or to volatile memory 678 (e.g., RAM). The memory controller 676 can include an ASIC and/or a processor with its own memory resources (e.g., volatile and/or non-volatile memory). The volatile memory 678 can include one or a plurality of memory modules (e.g., chips).

The processor resources 674 can be connected to a bus 668 to provide for communication between the processor resources 674, the network connection 680, and other portions of the system 600. The non-volatile memory 662 can provide persistent data storage for the system 600. The graphics controller 664 can connect to a user interface 670, which can provide an image to a user based on activities performed by the system 600.

Each system can include a computing device including control circuitry such as a processor, a state machine, application specific integrated circuit (ASIC), controller, and/or similar machine. As used herein, the indefinite articles "a" and/or "an" can indicate one or more than one of the named object. Thus, for example, "a processor" can include one processor or more than one processor, such as a parallel processing arrangement.

The control circuitry can have a structure that provides a given functionality, and/or execute computer-readable instructions that are stored on a non-transitory computer-readable medium (e.g. non-transitory computer-readable medium 672). The non-transitory computer-readable medium can be integral, or communicatively coupled, to a computing device, in either in a wired or wireless manner. For example, the non-transitory computer-readable medium 672 can be an internal memory, a portable memory, a portable disk, or a memory located internal to another computing resource (e.g., enabling the computer-readable instructions to be downloaded over the Internet). The non-transitory computer-readable medium 672 can have computer-readable instructions stored thereon that are executed by the control circuitry (e.g., processor) to provide a particular functionality.

The non-transitory computer-readable medium, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), among others. The non-transitory computer-readable medium can include optical discs, digital video discs (DVD), Blu-Ray Discs, compact discs (CD), laser discs, and magnetic media such as tape drives, floppy discs, and hard drives, solid state media such as flash memory, EEPROM, phase change random access memory (PCRAM), as well as other types of computer-readable media.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

In the foregoing Detailed Description, some features are grouped together in a single example for the purpose of streamlining the disclosure. This method of disclosure is not to be interpreted as reflecting an intention that the disclosed examples of the present disclosure have to use more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

What is claimed:

1. A computer-implemented method for managing shared memory, comprising:
building an interference graph associated with a number of shared memory locations;
statically assigning a first number of locks to a portion of the number of shared memory locations during compile-time of a program based on the interference graph;
dynamically assigning a second number of locks to a remaining portion of the number of shared memory locations during runtime of the program.

2. The method of claim 1, further comprising searching the portion of the shared memory locations for potential false conflict shared memory locations and selecting a number of the potential false conflict shared memory locations for static lock assignment.

3. The method of claim 1, wherein the statically assigned first number of locks is assigned to those shared memory locations for which a compiler has must-alias information.

4. The method of claim 3, wherein the method further comprises the compiler creating statically allocated locks in response to a shared memory location being selected for static lock assignment.

5. The method of claim 1, wherein the method further comprises using the interference graph to capture relationships between shared memory locations.

6. The method of claim 5, wherein using the interference graph comprises demonstrating shared memory locations having associated assigned nodes, wherein edges are added between a first node and a second node when there exists an atomic section that accesses the first node but not the second node and an atomic section that accesses the second node but not the first node.

7. The method of claim 1, wherein the method further comprises a compiler inserting code to create locks at runtime in response to a dynamically assigned shared memory location being selected for static lock assignment.

8. The method of claim 1, further comprising communicating a static lock assignment to the runtime.

9. The method of claim 8, wherein communicating the static lock assignment to the runtime includes establishing a handshake mechanism between a compiler and the runtime.

10. The method of claim 1, further comprising using one of the first number of locks for a particular shared memory location at runtime.

11. The method of claim 10, further comprising using one of the second number of locks for the particular shared memory location at runtime in response to the particular shared memory location not having one of the first number of locks assigned thereto.

12. The method of claim 11, further comprising:
retrieving one of the first number of locks for the particular shared memory location in response to the particular shared memory location having one of the first number of locks assigned thereto; and
retrieving one of the second number of locks from a dynamic lock table using a hash function in response to the particular shared memory location not having one of the first number of locks assigned thereto.

13. A non-transitory computer-readable medium having instructions stored thereon executable by a processor to:
select must-aliases from a number of shared memory locations for static lock assignment using an interference graph;
statically assign a first number of locks to a portion of the number of shared memory locations during compile-time of a program based on the selected must-aliases and the interference graph;
dynamically assign a second number of locks to a remainder of the number of shared memory locations during runtime of the program;
communicate the compile-time lock assignment to the runtime by establishing a handshake mechanism between the compiler and the runtime;
retrieve a specific one of the second number of locks at runtime for a specific one of the shared memory locations.

14. A computing system, comprising:
shared memory resources;
a processor communicatively coupled to the shared memory resources, wherein the processor is configured to:
statically assign a first number of locks to a portion of the shared memory resources during compile-time of a program;
dynamically assign a second number of locks to a remaining portion of the shared memory resources during runtime of the program; and
a compiler executed by the processor, wherein the compiler is configured to:
build an interference graph associated with a number of shared memory locations within the shared memory resources;
assign the first number of locks to the portion of the shared memory resources based on the interference graph;
insert code to communicate the first number of locks to the runtime; and
retrieve a specific one of the second number of locks at runtime for a specific one of the shared memory resources.

15. The computing system of claim 14 wherein the first number of locks and the second number of locks are used to manage addresses in the shared memory resources.

* * * * *